June 4, 1968            M. I. RING            3,386,693

FLOWER ARRANGEMENT HOLDER

Filed March 7, 1966

INVENTOR.

MARIE I. RING

BY

*Pearson & Pearson*

ATTORNEYS

United States Patent Office 3,386,693
Patented June 4, 1968

3,386,693
FLOWER ARRANGEMENT HOLDER
Marie I. Ring, 21 St. James Ave.,
Haverhill, Mass. 01830
Filed Mar. 7, 1966, Ser. No. 532,390
4 Claims. (Cl. 248—27.8)

ABSTRACT OF THE DISCLOSURE

A device for holding the stems of flowers in a desired arrangement on an object such as a mantlepiece, gravestone, or doorway, the holder being an elongated band, or tape, of flexible, resilient, stretchable material having narrow elongated slits spaced therealong from end to end, each slit being defined by at least two narrow integral stretchable strips normally in the plane of the band. When the slitted band is stretched taut on an object, the flower stems are inserted in the various slits, by laterally stretching the strips out of the plane of the band, thereby resiliently retaining the flowers of the arrangement in position.

---

This invention relates to an improved holder for cut plant material, especially for use in flower arrangements over doorways, on mantel-pieces, around gravestones, or the like.

In the professional floral art, it is conventional to wire blossoms and greens together into a unitary bodily-transportable mass, such as a wreath or a spray, as shown in United States Patent No. 2,319,243 to Livingston of May 18, 1943. The pattern, or composition, of such masses is usually funereal and stilted, with little indication of planned, life-like, naturally-growing plants. The hanging of such a spray or wreath on a gravestone, the laying thereof on a casket, or on a similar object, is often impractical, and it must be leaned against the object, or placed on the object in an inartistic position subject to removal by the force of gravity, by the elements, or by vandals.

In the non-professional flower arrangement art, it is customary to arrange cut plant material in vases, or other receptacles, in any of a variety of interesting designs, wherein the flowers and greens are made to appear graceful and natural. Holders are conventional for use in such receptacles to support the plant stems in an upstanding position, for example, holders such as shown in United States Patent No. 1,962,110 to Ash of June 12, 1934, or in United States Patent No. 1,196,312 to Stuck of Aug. 20, 1960, or the equivalent thereof. Also used as holding material is a putty-like substance, in lump, or tape, form, and adhesive coated paper, both such holders requiring adhesion which may damage a background surface, such as wood, or wall paper.

The flower arrangement holder of this invention comprises at least one narrow band of stretchable flexible material having at least one longitudinally extending row of spaced, elongated slits, each defining a pair of integral stretchable strips therealong and having securing means at each opposite end, the band preferably being about eighty-four inches in length. The band will stretch to about twice its length and may be tautly adjusted around a gravestone in a closed loop, or one or more bands, end to end, may be stretched around a doorway, or over a mantel-piece, with the opposite ends looped around cup hooks, nails, or the like. In stretched, taut condition, the elongated stretched strips may be stretched laterally out of the plane of the band, thereby forming a plurality of spaced loops, or pockets to receive and support a plurality of individual stems of cut plant material and resiliently retain the plants in upstanding position against a wall, frame, or stone face, in any selected planned design. The depending portions at the end of the holder, when mounted on a doorway or mantel, hold the cut material vertically or horizontally, depending on the composition, by frictional, resilient engagement of the stretched strips on the stems and by resilient pressure of the upper portion of the plants against the background.

The principal object of the invention is to provide an elongated, resilient, flexible, stretchable band, usually of rough surfaced woven textile fabric, having spaced, narrow slits each defining a narrow integral, stretchable strips on each opposite side thereof entirely therealong and having means for securing the band in stretched, taut condition on an object to be florally decorated.

Another object of the invention is to provide such a stretchable strip flexible, resilient, apertured, band capable of being stretched to about twice its normal length and adapted to be adjustably affixed in a closed loop around a gravestone to serve as a stem holder for an elongated silhouette type floral decoration.

A further object of the invention is to provide such a stretchable strip multiple apertured band with loop-forming means at each end, preferably of the hooked buckle type, affixable in any of the apertures of the band, so that the band length may be adjusted, the band may be formed in a closed loop, or several bands may be attached end to end to each other.

Other objects and advantages of the invention will be apparent from the claims, from the description of the drawing, and from the drawing in which:

Figure 4:
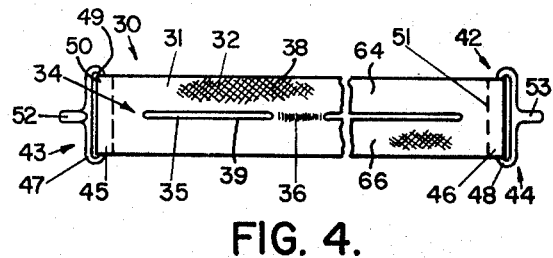
FIGURE 4 is an enlarged front elevation of the band of the invention, in normal, unstretched condition.

As shown in FIGURE 4, the flower arrangement holder 30 of the invention preferably comprises an elongated, narrow band 31, of resilient, flexible, stretchable material 32, the band being about three-quarters of an inch in width and eighty-four inches in length in normal, unstretched condition. Band 31 is preferably of uniform width and of a color to blend unobtrusively with the individual, cut plant material designated 33, for example, the color green. A row 34 of longitudinally extending narrow, slit-type apertures 35 extends longitudinally of band 31, with the elongated apertures preferably equally spaced apart by webs 36 of the material 32 for substantially the full length of the band. Each narrow elongated slot, or aperture 35, is defined by a pair of stretchable strips 64 and 66, integral with, and normally planar with, the band, the strips being laterally stretchable out of the plane of the band to each form a resilient closed loop, or pocket, for receiving and resiliently retaining one or more flower stems. It has been found preferable to provide elongated apertures, or slits 35, of about one inch in length, separated by webs 36 of about one-half inch in lengths, the apertures stretching to about two inches in length when the band is stretched to twice its length, or to about one hundred fifty inches. Such proportions have proved suitable for snug looping around the typical gravestone, or for mounting along the typical doorframe or mantel, but are intended as illustrative and not to limit the scope of the invention.

Preferably the material 32 is a woven, meshed, textile strap having a relatively rough, friction surface due to the weave, yarn, and multiple meshes 38, and preferably the apertures 35 are similar to button-holes in having reinforced edges 39. However, other commercially available stretchable, resilient, narrow fabrics are usable whether woven, knitted, stretchable plastic tape, or the equivalent.

Securing means 42, preferably comprising loop-forming means 43 and 44, is provided at each opposite end 45 and 46 of the band 31. Preferably, means 43 and 44 are hook buckles 47 and 48, each having a cross bar 49 held in an end loop 50 at an end 45 of band 31 by stitches 51, or staples, and having a hook 52 adapted to be received in any one of the apertures 35. Preferably also, the hook 52 of one buckle 47, faces in a direction opposite to the corresponding hook 53 of the other buckle 48. Thus when the band 31 is a closed loop, each hook is engaged in an aperture without twisting of the band, in any size loop desired. It would be possible to use snap fasteners, "Velcro" hook and pile fasteners, grommets, or other securing means, on the ends of band 31, but the reversed hooked buckles 47 and 48 lend themselves to full length adjustment of the length of the band as well as to attachment of several bands, end to end, for any adjusted length desired by reason of the full length rows 34 of apertures 35.

Figure 1:
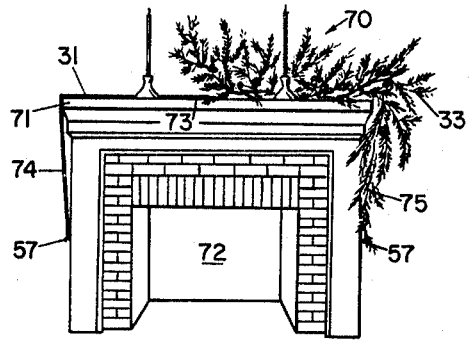
FIGURE 1 is a front elevation of a typical fireplace mantel with the flower holder of the invention in use thereon.
Figure 2:
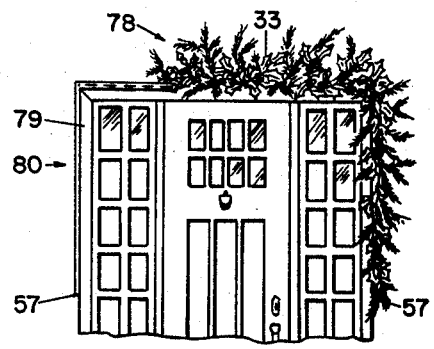
FIGURE 2 is a front elevation of a typical doorway frame with the flower holder of the invention in use thereon.
Figure 3:
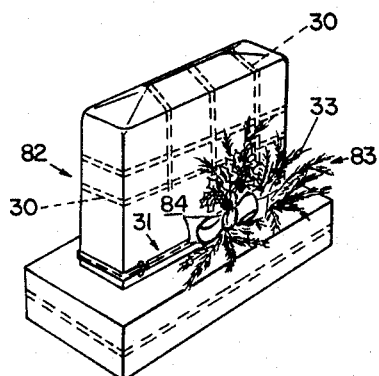
FIGURE 3 is a perspective view of a typical gravestone, with the flower holder of the invention looped therearound.
Figure 5:
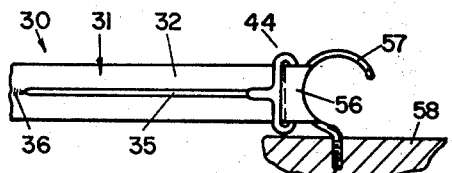
FIGURE 5 is a view similar to FIGURE 4, showing the band in taut, stretched condition.

The band 31 of the invention is shown in taut, stretched condition in FIGURE 5, with the end loop 56, created by the turning of the band back upon itself, and hooking into the end aperture, fixed by a cup hook 57 screwed into a wood background 58. When the integral stretchable strips 64 and 66 are stretched laterally out of the plane of the band, it will be seen that several flower stems may be inserted in the narrow elongated slit 35 as illustrated in FIGURES 1, 2 and 3.

Figure 6:
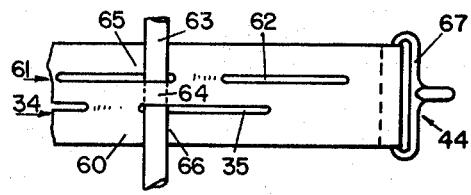
FIGURE 6 is a view similar to FIGURE 4, showing an embodiment of the invention in which the apertures are staggered and overlapping.

In FIGURE 6, the band 60 is identical with band 31, except that there is a second row 61 of apertures 62, in addition to row 34, of apertures 35, and the apertures 35 and 62 not only are staggered but overlap each other. This embodiment permits one or more stems 63, of cut plant material 33 to be inserted under one strip 64 of the band and over two strips 65 and 66 of the band for greatly increased frictional engagement and resilient grip to further insure the anchoring of the stems 63.

Figure 7:
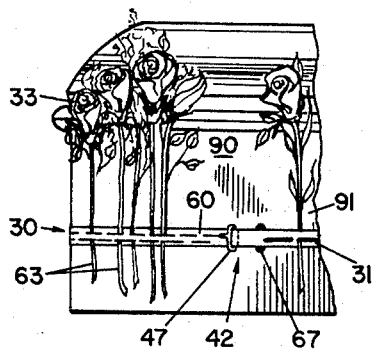
FIGURE 7 is a fragmentary view, on a reduced scale, showing a plurality of stems in each stretched aperture of the band of the invention.

In operation, for example, as a holder for the flower arrangement 70, on the mantel-piece 71 of a fireplace 72, a single band 31 may be stretched to about twelve feet of length, with the central portion 73 supported horizontally by the mantel-piece shelf and the two opposite end portions 74 and 75 extending downwardly and anchored by cup hook 57. The stems 63 of the cut plant material 33 are then inserted in the elongated apertures 35 of the band, and over or under the laterally stretched resilient strips 64, 65 or 66, in a planned, but natural-appearing elongated floral arrangement, alternating with flower blossoms 76 and greenery 77. A pair, or more, of bands 31, may be joined end to end to create a longer arrangement 78, as shown, extending over and down the frame 79 of the doorway 80 of FIGURE 2. In FIGURE 3 a single band 31 is formed into a closed loop around the obelisk portion 81 of gravestone 82, preferably near the base thereof, to hold the flower arrangement 83 on one upstanding vertical face 84, or on all four faces if desired. In FIGURE 7, a pair of bands 31 and 60 are joined end to end, by the affixing of the buckle hooks of one in the apertures of the other to encircle the casket 90. The single, or plural, bands are adjusted to the girth of the casket, or the gravestone of FIGURE 3, so that the bands are taut and resilient to anchor the stem 63 while the remaining portions of the cut plant material 33 are resiliently held against the background, such as the exterior side wall 91 of the casket.

As shown in dotted lines in FIGURE 4, the flower arrangement holder 30 of the invention may be tautly and snugly fitted around an object, at any desired height, or several such holders may be interconnected by hooks and apertures to extend both around and over the object. A conventional wreath or spray may be supported on the face of the object, or may be anchored in place on the top of the object to interweaving the bands 31 or 60 in the structure of the floral display, or the entire object may be covered with a cut plant material design.

The band of the invention is preferably of nylon. While not illustrated, a band may be entwined around a vertical porch pillar or along the railing of a stairway with flowers arranged in the apertures in a pleasing decoration. The band may also be looped around a glass top of a patio table to anchor a floral arrangement centerpiece.

What is claimed is:

1. A flower arrangement holder for supporting cut plant material in an elongated, planned composition on an object, said holder comprising:

an elongated, narrow band of resilient flexible stretchable material capable of stretching to at least about twice its normal length;

a plurality of longitudinally extending narrow slit apertures spaced along substantially the full length of said band, each narrow slit aperture defining a stretchable strip integral with, and normally planar with, said band on each opposite side thereof, said strips being stretchable laterally out of the plane of said band to form resilient loops adapted to receive at least one stem of said plant material;

said apertures and the two stretchable strips defined thereby being staggered relative to each other and overlapping each other;

each said aperture and strip being normally about one inch in length but being about two inches in length when said band is so stretched; and securing means mounted at each opposite end of said band for detachably affixing the same on said object in said stretched condition, whereby a stem of said cut plant material may be passed transversely through two overlapping apertures to increase the frictional contact thereof with said band.

2. In combination with a plurality of individual cut plants adapted for use in a flower arrangement, each said plant having an elongated stem:

a flower arrangement holder for supporting said plants on an object, said holder comprising an elongated flexible, resilient band of stretchable material, said band being under elastic tension and stretched across a face of said object;

a plurality of elongated, slit type apertures extending longitudinally of said band from proximate one end thereof to proximate the other end thereof, intermediate of the width of said band;

each said aperture having at least two narrow elongated, stretchable strips, each on an opposite side thereof and integral with said band;

each said strip being normally in the plane of said band but being stretched under elastic tension in a direction normal to said plane to spread said aperture and form a resilient loop with at least one of said stems received and retained therein, and securing means at each opposite end of said band retaining the same in longitudinally stretched condition on said object with the cut plants in said apertures forming said flower arrangement.

3. A combination as specified in claim 2, wherein said apertures are aligned end to end in a single row, each said aperture being at least one inch in length and separated from the adjacent apertures by webs of about one half inch in length when said band is unstretched, said apertures and the strips on each opposite side thereof being at least two inches in length when so stretched on an object.

4. A combination as specified in claim 2, wherein said stretchable material is a woven, meshed textile strap having a relatively rough frictional surface, and said apertures and strips are stretched to at least two inches in length, said frictional surface and the tension of said stretched strips preventing said cut stems from moving within said apertures after insertion therein.

References Cited

UNITED STATES PATENTS

| | | | |
|---|---|---|---|
| 1,014,004 | 1/1912 | Irwin | 248—102 |
| 1,963,824 | 6/1934 | Cassedy. | |
| 2,516,379 | 7/1950 | Gano | 248—27.8 |
| 2,595,174 | 4/1952 | Singer | 24—6 |
| 3,044,200 | 7/1962 | Teufel | 161—31 |
| 3,164,343 | 1/1965 | Cucullo | 248—27.8 |

JOHN PETO, *Primary Examiner.*